United States Patent
Pariseau et al.

(10) Patent No.: US 9,644,685 B2
(45) Date of Patent: May 9, 2017

(54) OUTPUT SHAFT ADAPTER

(71) Applicant: Ford Global Technologies, LLC, Dearborn, MI (US)

(72) Inventors: David Michael Pariseau, Royal Oak, MI (US); Christopher Peter Nicholas, Milford, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 14/682,138

(22) Filed: Apr. 9, 2015

(65) Prior Publication Data
US 2016/0298692 A1    Oct. 13, 2016

(51) Int. Cl.
*F16D 1/033* (2006.01)
*B60K 17/22* (2006.01)
*F16D 1/02* (2006.01)

(52) U.S. Cl.
CPC ............ *F16D 1/033* (2013.01); *B60K 17/22* (2013.01); *F16D 1/02* (2013.01); *Y10T 29/49895* (2015.01); *Y10T 29/49963* (2015.01); *Y10T 403/645* (2015.01)

(58) Field of Classification Search
CPC ........ F16D 1/033; F16D 1/02; Y10T 403/645; Y10T 29/49895; Y10T 29/49963; B60K 17/22
USPC .......... 464/93, 118, 182; 403/299, 336, 337, 403/342, 359.5; 29/525.11, 464; 33/412
See application file for complete search history.

(56) References Cited

U.S. PATENT DOCUMENTS

| 3,635,303 | A | * | 1/1972 | Hetmann | B60B 3/14 |
| 4,114,472 | A | * | 9/1978 | Hornig | B60K 17/22 |
| 4,516,956 | A | * | 5/1985 | Staiert | F16D 3/76 |
| 4,932,924 | A | | 6/1990 | Löbel | |
| 5,112,189 | A | * | 5/1992 | Halek | F04D 29/263 403/337 |
| 5,836,713 | A | * | 11/1998 | Brassert | F16D 1/06 464/182 X |
| 7,029,398 | B1 | * | 4/2006 | Burnard | F16D 3/387 |
| 7,874,925 | B2 | | 1/2011 | Dewhirst | |
| 2008/0064511 | A1 | | 3/2008 | Brace et al. | |
| 2013/0169120 | A1 | * | 7/2013 | Cutter, III | H02K 11/22 29/464 X |
| 2013/0294822 | A1 | | 11/2013 | Raymond | |

FOREIGN PATENT DOCUMENTS

| CN | 203202054 U | | 11/2013 |
| CN | 203297397 U | | 11/2013 |
| DE | 102011113417 A1 | | 3/2013 |
| FR | 965381 | * | 9/1950 |
| GB | 3113 | * | 0/1890 |

* cited by examiner

*Primary Examiner* — Gregory Binda
(74) *Attorney, Agent, or Firm* — James Dottavio; Brooks Kushman P.C.

(57) ABSTRACT

A transmission includes an output shaft. The output shaft is configured to transmit torque from the transmission through an output shaft flange to a driveshaft. The transmission further includes an adapter having a first threaded portion, a second threaded portion, and a journal. The first threaded portion is received by the output shaft. The journal extends from the second threaded portion and is configured to align the driveshaft with the output shaft.

9 Claims, 3 Drawing Sheets

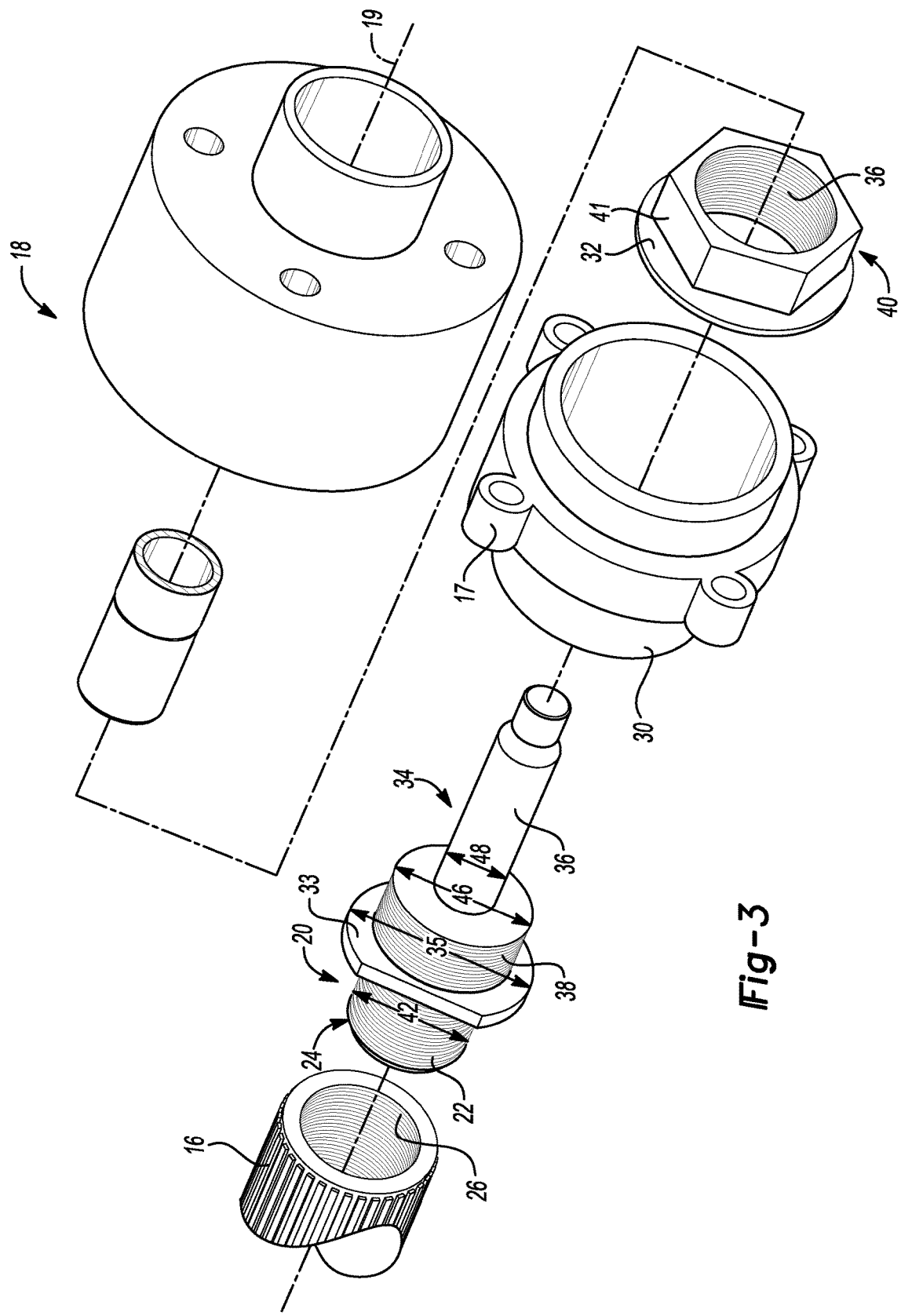

OUTPUT SHAFT ADAPTER

TECHNICAL FIELD

The present disclosure relates to output shaft adapters for vehicle transmissions.

BACKGROUND

Vehicle transmissions produce torque to propel the vehicle. Torque is generated by an internal combustion engine and transferred through a transmission using a plurality of gears. The rotational movement of the gears transfer torque through an output shaft. Transmission output shafts may have various configurations depending on vehicle type, size, or torque requirements. Transmitting torque through the transmission output shaft to the driveline requires a coupling between the output shaft and a driveshaft.

SUMMARY

A method for transmitting torque through a transmission includes the steps of splining an output flange to an output shaft, threading a first end of an adapter into a bore defined in the output shaft, aligning a driveshaft along a central axis of the output shaft using a smooth second end of the adapter, and fastening the output flange to the driveshaft.

A powertrain includes a transmission, an output flange, a driveshaft, and an adapter. The transmission includes an output shaft with a central axis. The output flange is splined to the output shaft. The driveshaft is mechanically fixed to the output flange. The adapter has a first portion threaded into the output shaft along the central axis, a second threaded portion, and a smooth third portion. The smooth third portion extends from the second threaded portion axially about the central axis to align the output flange and the driveshaft along the central axis.

A transmission includes an output shaft. The output shaft is configured to transmit torque from the transmission through an output shaft flange to a driveshaft. The transmission further includes an adapter having a first threaded portion, a second threaded portion, and a journal. The first threaded portion is received by the output shaft. The journal extends from the second threaded portion and is configured to align the driveshaft with the output shaft.

BRIEF DESCRIPTION OF THE DRAWINGS

FIG. 3 is a side view of an adapter integral to the output shaft of the transmission.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
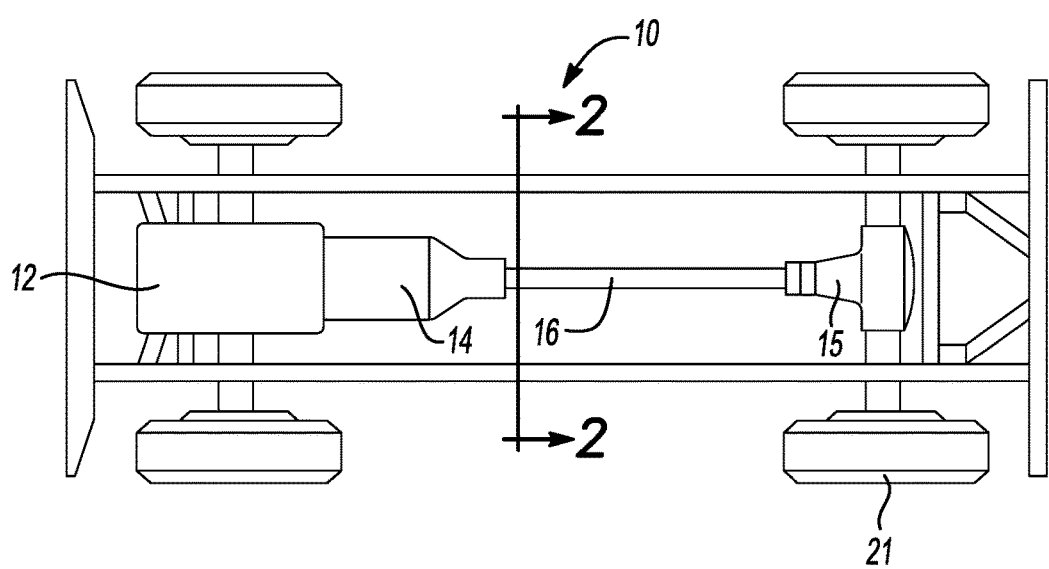
FIG. 1 is a schematic of a vehicle.

FIG. 1 depicts a schematic of a vehicle 10. The vehicle 10 includes an engine 12, a transmission 14 including an output shaft 16, a driveshaft 18, a differential 15, and wheels 21. The engine 12 provides torque through the transmission 14 and driveshaft 18 to the wheels 21. The output shaft 16 provides the final torque reduction from the transmission 14 to the driveshaft 18. The driveshaft 18 transfers the torque through the differential 15 to the wheels 21. The torque transfer from the driveshaft 18 provides propulsion for the vehicle 10. Coupling between the output shaft 16 and the driveshaft 18 may be accomplished in a variety of ways depending on the architecture of the transmission 14 and the vehicle requirements. Coupling between the output shaft 16 and the driveshaft 18 may require low manufacturing tolerances to reduce driveline disturbances, such as rotational noise, vibration, and harshness from the transfer of torque.

Differing attachment strategies between vehicle architectures requiring low manufacturing tolerances may be problematic. For example, an increased number of parts required for variances between vehicle architectures result in increased tolerance stacks. A reduction in manufacturing complexity while maintaining standard machining tolerances is a benefit in the final cost of the vehicle 10. Further, needing a variety of coupling strategies, based on the vehicle architecture, increases the overall manufacturing time and complexity for the vehicle 10. Differing attachment schemes may require different output shaft 16 and driveshaft 18 interfaces. It may be advantageous to develop a common output shaft attachment scheme and provide adaptive attachment strategies based on vehicle requirements which allows for the necessary run-out tolerances and standard manufacturing of a single part. This may improve drivability by reducing the rotational noise, vibration, and harshness between the interface of the output shaft 16 and the driveshaft 18.

Figure 2:
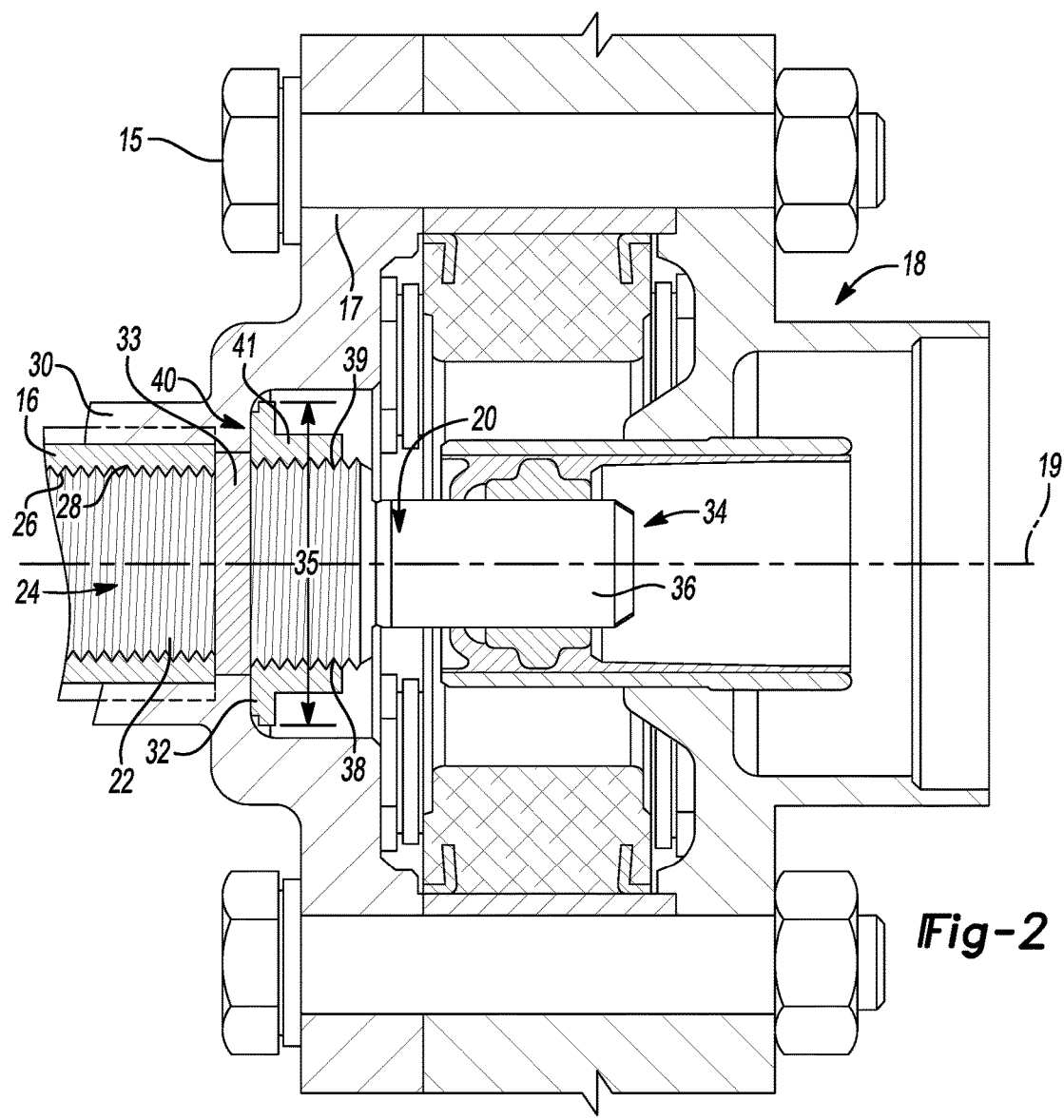
FIG. 2 is a cross-sectional view taken along line 2-2 of FIG. 1 of a transmission output shaft coupled with a vehicle driveshaft using an adapter.

FIG. 2 depicts a cross-sectional view taken along the lines 2-2 in FIG. 1 of the attachment between the output shaft 16 and the driveshaft 18. The output shaft 16 couples to the driveshaft 18 using an output shaft flange 30 having a plurality of attachment points 17 disposed radially offset of a central axis 19. The attachment points 17 may be an array of bolts 15 disposed through the output flange 30 mechanically fastening the output flange 30 to the driveshaft 18. An adapter 20 aids the attachment between the output shaft 16, the output flange 30, and the driveshaft 18. The adapter 20 includes a first threaded portion 22 at a first end 24. The first threaded portion 22 engages the output shaft 16. The output shaft 16 further defines a bore 26 configured to receive the first threaded portion 22 of the adapter 20. The bore 26 may use a complementary threaded surface 28 to secure the adapter 20 to the output shaft 16. The first threaded portion 22 and the complementary bore 26 allow the adapter 20 and the output shaft 16 to be coaxial, or integral. An integral adaptor 20 allows easier manufacturing for achieving the low run-out tolerances required to reduce noise, vibration, and harshness, and improve drivability.

The adapter 20 allows for standardization of the output shaft 16. Being coaxial, a standard output shaft 16 may be used in conjunction with the adapter 20 to meet the tolerances without the need for specially designed parts per vehicle architecture. A single output shaft 16 may be used with the adapter 20 to transfer torque generated by the transmission 14 to the driveshaft 18 regardless of the vehicle architecture. For example, multiple output flange 30 attachment strategies can be accommodated by a common output shaft 16 to couple the transmission 14 to the driveshaft 18 using the adaptor 20. The adapter 20 may be configured to couple output shaft flanges 30 of various transmissions 14 to the driveshaft 18. The adapter 20 therefore eases manufacturing of the output shaft 16 and reduces the overall number of parts needed per vehicle architecture.

The output shaft flange 30 is maintained splined to the output shaft 16 by the adaptor 20 and attaching flange nut 40. The flanged nut 40 includes a bushing 32 and a locking member 41. The flanged nut 40 may have a diameter 35 such that the bushing 32 engages the output shaft flange 30 when the first end 24 of the adapter 20 is secured to the output shaft 16. The diameter 35 of the flanged nut 40 may aid in securing the output shaft flange 30 to the output shaft 16. The diameter 35 of the flanged nut 40 provides a rigid coupling between the output shaft flange 30 and the output shaft 16. In at least one embodiment, the flanged nut 40 has a hexagonal cross-section. The flanged nut 40 may include other cross-sections, such as square, circular, or any other cross-sectional area that allows the flanged nut 40 to secure the output shaft flange 30 to the output shaft 16.

The driveshaft 18 couples to the output shaft flange 30 and is radially maintained at a second end 34 of the adapter 20 disposed opposite the first end 24. The adapter 20 may further include a stop 33. The first threaded portion 22 of the adapter 20 may end at the stop 33. The second end 34 may include a smooth portion 36 and a second threaded portion 38. The second threaded portion 38 is disposed adjacent the stop 33. The stop 33 separates the first threaded portion 22 from the second threaded portion 38. And the smooth portion 36 extends from the second threaded portion 38. The driveshaft 18 is configured to engage to the smooth portion 36 of the adapter 20. The smooth portion 36 of the second end 34 acts as a journal or spigot to pilot the attachment of the driveshaft 18. Attachment between the smooth portion 36 of the adapter 20 and the driveshaft 18 couples the driveshaft 18 to the output shaft 16.

The flanged nut 40 is configured to engage the second threaded portion 38. The flanged nut 40 uses a complementary threaded bore 39 to receive the second threaded portion 38. Attachment of the flanged nut 40 to the second threaded portion 38 of the adapter 20 further secures the output flange 30 to the output shaft 16. This further reduces any rotational noise, vibration, or harshness that may disturb drivability by tightening the attachment between the output flange 30 and the output shaft 16. And further the flanged nut 40 prevents any axial movement between the output flange 30 and the output shaft 16. The flanged nut 40 reduces a loss of torque transfer by reducing the axial movement between the output shaft 16 and the driveshaft 18. The flanged nut 40 may be any locking device, such as, but not limited to a nut, a screw, or any other threaded attachment.

The smooth portion 36 of the second end 34 of the adapter 20 provides a means for attaching the driveshaft 18 to the output shaft 16. In at least one embodiment, the smooth portion 36 provides a pilot spigot to a flex-couple driveshaft 18. The flex-couple attachment driveshaft 18 may require a low run-out tolerance spigot 36. The fixed-flange driveshaft 18 may be any type of fixed-flange driveshaft 18 including, but are limited to a flat fixed-flange driveshaft 18, cup fixed-flange driveshaft 18, funnel-type fixed-flange driveshaft 18, or slip-yoke driveshaft 18. To achieve a minimal run-out tolerance of the smooth portion 36 of the adapter 20 relative to the output shaft 16, final processing of this surface should occur after assembly of the adapter 20 to the output shaft 16.

Using the adapter 20 also provides for a method of transmitting torque through the transmission. For example, the torque is transmitted through the adapter 20 by splining the output flange 30 to the output shaft 16 and threading the first end 24 of the adapter into the bore 26 of the output shaft 16. Aligning the driveshaft 18 along the central axis 19 and fastening the driveshaft 18 to the output flange 30 creates a torque path through the adapter. Retaining the output flange 30 axially along the central axis 19 of the output shaft by securing the flanged nut 40 to the second threaded portion 38 of the second end 34 of the adapter 20 aids to ensure minimal disturbances are felt during the torque transmission.

FIG. 3 depicts a schematic view of the adapter 20. The schematic shown in FIG. 3 further depicts the relation between the components of the adapter 20. For example, the stop 33 is disposed between the first threaded portion 22 at the first end 24 and the second threaded portion 38. And the smooth portion 36 extends from the second threaded portion 38 away from the stop 33 at the second end 34. As can be seen in FIG. 3, the first end 24 is disposed opposite the second end 34. The flanged nut 40 slides over the smooth portion 36 to engage the second threaded portion 38. The flanged nut 40 attaches to the second threaded portion 38 up to the stop 33.

The first threaded portion 22 may have a first diameter 42 configured to fit within the bore 26 of the output shaft 16. The threaded engagement between the first threaded portion 22 and the bore 26 of the output shaft 16 reduces the radial movement between the adapter 20 and the output shaft 16. Reducing the radial movement between the adapter 20 and the output shaft 16 allows for tighter tolerances when manufacturing the adapter 20.

The second diameter 46 of the second threaded portion 38 allows the flanged nut 40 to create a resistive force preventing the output flange 30 from moving axially off of the output shaft 16. The smooth portion 36 has a third diameter 48 smaller than the second diameter 46 of the second threaded portion 38. The third diameter 48 of the smooth portion 36 allows the flanged nut 40 to slide over the smooth portion 36 and engage the second threaded portion 38. The third diameter 48 of the smooth portion 36 engages the driveshaft 18. The third diameter 48 of the smooth portion 36 allows the smooth portion 36 to act as a spigot to pilot the attachment between the adapter 20 and the driveshaft 18, and therefore of the output shaft 16 and the driveshaft 18. The various components of the adapter 20 allow for a universal coupling between the output shaft 16, via the output flange 30, and the driveshaft 18. The adapter 20 allows one common output shaft to be used across a variety of output shaft flange attachment strategies.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated.

While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
    an output shaft configured to transmit torque from the transmission through an output shaft flange to a driveshaft;
    an adapter having a first threaded portion received by the output shaft, a second threaded portion, and a journal extending from the second threaded portion and configured to align the driveshaft with the output shaft; and
    a stop separating the first threaded portion from the second threaded portion.

2. The transmission of claim 1, further comprising a flanged nut in threaded engagement with the second threaded portion retained against the output flange axially aligning an attachment between the output flange and the driveshaft.

3. The transmission of claim 1, further comprising a plurality of attachment points disposed on the output flange radially offset a central axis of the output flange.

4. The transmission of claim 3, wherein the plurality of attachment points defines an array of bolts to mechanically fasten the output flange to the driveshaft.

5. A powertrain comprising:
    a transmission including an output shaft with a central axis;
    an output flange splined to the output shaft;
    a driveshaft mechanically fixed to the output flange; and
    an adapter having a first portion threaded into the output shaft along the central axis, a second threaded portion, and a smooth third portion extending from the second threaded portion axially about the central axis to align the output flange and the driveshaft along the central axis; and
    a flanged nut in threaded engagement with the second threaded portion, to retain the output flange axially along the central axis.

6. The powertrain of claim 5, further comprising a stop disposed between the first portion and the second threaded portion.

7. The powertrain of claim 5, further comprising a plurality of attachment points disposed on the output flange radially offset about the central axis.

8. The powertrain of claim 7, further comprising an array of bolts disposed through a bore defined at the plurality of attachment points fastening the driveshaft to the output flange.

9. A method for transmitting torque through a transmission comprising:
    splining an output flange to an output shaft;
    threading a first end of an adapter into a bore defined in the output shaft;
    aligning a driveshaft along a central axis of the output shaft using a smooth second end of the adapter;
    fastening the output flange to the driveshaft; and
    retaining the output flange axially along the central axis of the output shaft by securing a flanged nut to a second portion of the second end of the adapter.

\* \* \* \* \*